(12) United States Patent
Damola et al.

(10) Patent No.: US 8,351,427 B2
(45) Date of Patent: Jan. 8, 2013

(54) HOME GATEWAY DEVICE FOR PROVIDING MULTIPLE SERVICES TO CUSTOMER DEVICES

(75) Inventors: Ayodele Damola, Solna (SE); Johan Kölhi, Vaxholm (SE); Jonathan Olsson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 701 days.

(21) Appl. No.: 12/520,937

(22) PCT Filed: Dec. 28, 2006

(86) PCT No.: PCT/SE2006/001507
§ 371 (c)(1),
(2), (4) Date: Nov. 24, 2009

(87) PCT Pub. No.: WO2008/082328
PCT Pub. Date: Jul. 10, 2008

(65) Prior Publication Data
US 2010/0061364 A1    Mar. 11, 2010

(51) Int. Cl.
*H04L 12/28* (2006.01)
(52) U.S. Cl. .......................... 370/389; 370/392
(58) Field of Classification Search .............. None
See application file for complete search history.

(56) References Cited

U.S. PATENT DOCUMENTS

| | | | |
|---|---|---|---|
| 6,490,290 B1 * | 12/2002 | Zhang et al. | 370/401 |
| 6,831,899 B1 * | 12/2004 | Roy | 370/260 |
| 6,948,076 B2 * | 9/2005 | Saito | 726/12 |
| 7,420,932 B1 * | 9/2008 | Zhang et al. | 370/254 |
| 7,788,394 B2 * | 8/2010 | Gregotski et al. | 709/231 |
| 7,801,054 B2 * | 9/2010 | Reichman et al. | 370/252 |
| 7,890,552 B2 * | 2/2011 | Reichman | 707/821 |
| 8,077,738 B2 * | 12/2011 | Zhang et al. | 370/466 |
| 8,165,156 B1 * | 4/2012 | Melsen | 370/466 |
| 2002/0006137 A1 * | 1/2002 | Rabenko et al. | 370/466 |
| 2003/0038730 A1 * | 2/2003 | Imafuku et al. | 340/825.24 |
| 2003/0079144 A1 * | 4/2003 | Kakemizu et al. | 713/200 |
| 2004/0090971 A1 * | 5/2004 | Anderson, IV | 370/401 |
| 2004/0203387 A1 * | 10/2004 | Grannan | 455/41.2 |
| 2005/0160477 A1 * | 7/2005 | Saito | 726/12 |
| 2006/0123092 A1 * | 6/2006 | Madams et al. | 709/206 |
| 2007/0127506 A1 * | 6/2007 | Absillis | 370/401 |
| 2007/0201872 A1 * | 8/2007 | Yim et al. | 398/66 |
| 2007/0206507 A1 * | 9/2007 | Reichman et al. | 370/252 |
| 2007/0258464 A1 * | 11/2007 | Hall et al. | 370/395.52 |
| 2009/0097554 A1 * | 4/2009 | Savoor et al. | 375/240.08 |
| 2009/0169207 A1 * | 7/2009 | Absillis | 398/58 |
| 2010/0070525 A1 * | 3/2010 | Clark et al. | 707/769 |
| 2010/0183127 A1 * | 7/2010 | Uy et al. | 379/88.22 |

\* cited by examiner

Primary Examiner — Otis L Thompson, Jr.

(57) ABSTRACT

A telecommunication node such as a home gateway and a method of routing data packets received from customer premises devices connected to the node. The node includes an operator-configurable service profile table for storing service profiles and a user-configurable customer devices table for storing the source addresses of the customer premises devices and associations between each source address and at least one of the service profiles. The operator controls service provisioning while the user can freely allocate the customer premises devices to different service profiles and can access a plurality of services from the same device.

18 Claims, 5 Drawing Sheets

HOME GATEWAY DEVICE FOR PROVIDING MULTIPLE SERVICES TO CUSTOMER DEVICES

TECHNICAL FIELD OF THE INVENTION

The present invention relates to a telecommunication node (such as a home gateway) and a method for routing data packets received from customer premises devices located in a local area network connected to said node.

DESCRIPTION OF RELATED ART

The internet has been an important driver to introduce broadband access to homes and small offices. Broadband technologies such as DSL (Digital Subscriber Line), cable based systems (including cable modems) and even fiber-based access systems are installed in millions of homes around the world and the number of broadband subscribers is constantly increasing.

In order to increase the revenues, broadband operators are looking for other possibilities than just being a bit pipe provider to the internet. To address this, a concept called 'triple-play' has been introduced. 'Triple-play' is a concept for delivering three different types of services such as data, television and telephone services over the same access. If mobile services also are included one talks about 'Quadruple-play'. Voice over IP (VoIP) is an example on a telephone service that can be offered over this access. IP television (IPTV) and video on demand (VoD) are other examples.

This broad service offering and the growing number of PCs and other appliances in each home, has put new requirements on residential or home gateways. A number of telecom operators have founded the so called Home Gateway Initiative (HGI) in order cope with these new requirements and to provide a common gateway specification. One delivery from this initiative has been the Home Gateway Technical Specification Release 1, Jul. 2006. This specification schematically discloses a home network architecture comprising a home gateway (HG) and at least one customer premises device called an 'end device' (ED) that could be a PC, a set-top box (STB) etc connected to the home gateway. The technical specification does also schematically disclose an architecture for the remote management of the home gateway. The specification does also suggest remote management procedures based on the technical report TR-069 from DSL Forum.

In patent prior art, a home gateway is disclosed in U.S. Pat. No. 6,853,637. This home gateway comprises a network adapter that communicates with local customer premises devices over a local shared communication medium. The gateway device also includes a DSL transceiver connected to a digital subscriber line. A home gateway is also disclosed US patent application US 2003/0101459. This patent application relates to a home gateway that enables customer premises devices of various technologies to selectively access external communication features.

In U.S. Pat. No. 7,006,486 a telecommunication system is disclosed, giving the options to a user to select desired services. The user or an operator configures the service ports which correspond to the desired services.

With the broad service offering and the growing number of customer premises devices in each home, the different services have to be allocated to the relevant device. A known approach to do this is to allocate each service to an individual port (a well-known example is port '80' for web services using the Hypertext Transfer Protocol HTTP).

SUMMARY OF THE INVENTION

A problem with the solution to allocate different services to individual ports is that a simple customer premises device having one port can only terminate one service. For multimedia PCs that are designed to support several services this solution means that multiple network cards are needed, one for each service. As a consequence of this another problem arises, that it is difficult to allocate and manage these services in a flexible manner.

These problems have been solved in the current invention by introducing a telecommunication node (such as a home gateway) that is arranged to route data packets from at least one customer premises device towards a service node where said telecommunication node comprises a routing table, a service profile table and a customer premises device table.

The routing table is arranged for determining an output interface adapted to forward the data packets by analyzing at least a destination address (for example comprising a destination IP address and a TCP/UDP port number) in the received data packet.

The service profile table comprises at least one service profile where each profile is associated with an output interface.

The customer premises device table comprises a source address (such as the MAC address) of at least one customer premises device, where the source address is associated with at least one of the service profiles.

When routing data packets from the customer premises device to the service node (providing for example IPTV) the telecommunication node determines at least the destination address and the source address in the received data packet and determines by analyzing at least the destination address an output interface adapted to forward the received data packet. The telecommunication node further determines the service profile that is associated with the output interface and if that service profile is associated with the source address of the customer premises device. If the service profile is associated with the source address, the telecommunication node forwards the received data packet towards the service node over the output interface. Optionally, the service profile can comprise a specific value of a Quality of Service QoS parameter that can be attached to the data packet before it is forwarded.

As an option, the telecommunication node can also be arranged to collect traffic measurement data related to the communication between the customer premises device and the service node.

An advantage with the current invention is that a customer premises device now can support a plurality of different services (optionally having different Qualities of Service QoS) on the same port as the source address of the customer premises device can be associated to more than one service profile.

Another advantage is that each of the service profile table, the routing table and the customer premises device table can be configured independently. For example, the network operator can configure the service profile table and the routing table, whereas the user can be restricted to configure the customer premises device table only. The user can easily configure which device to be used for which service and the operator can easily maintain control over the provision of the services by for example setting specific service parameters to each service (such as QoS values, maximum number of devices per service etc).

With detailed statistics derived form the optional feature of collecting traffic measurement data, the operator can among others improve the network resource management, improve network planning and construct new business models around the user's service behavior.

The objective with the current invention is therefore to provide greater flexibility for both the network operator and the user when dealing with the broad service offerings given to broadband subscribers.

The invention will now be described in more detail and with preferred embodiments and referring to accompanying drawings.

DETAILED DESCRIPTION OF EMBODIMENTS

Figure 1:
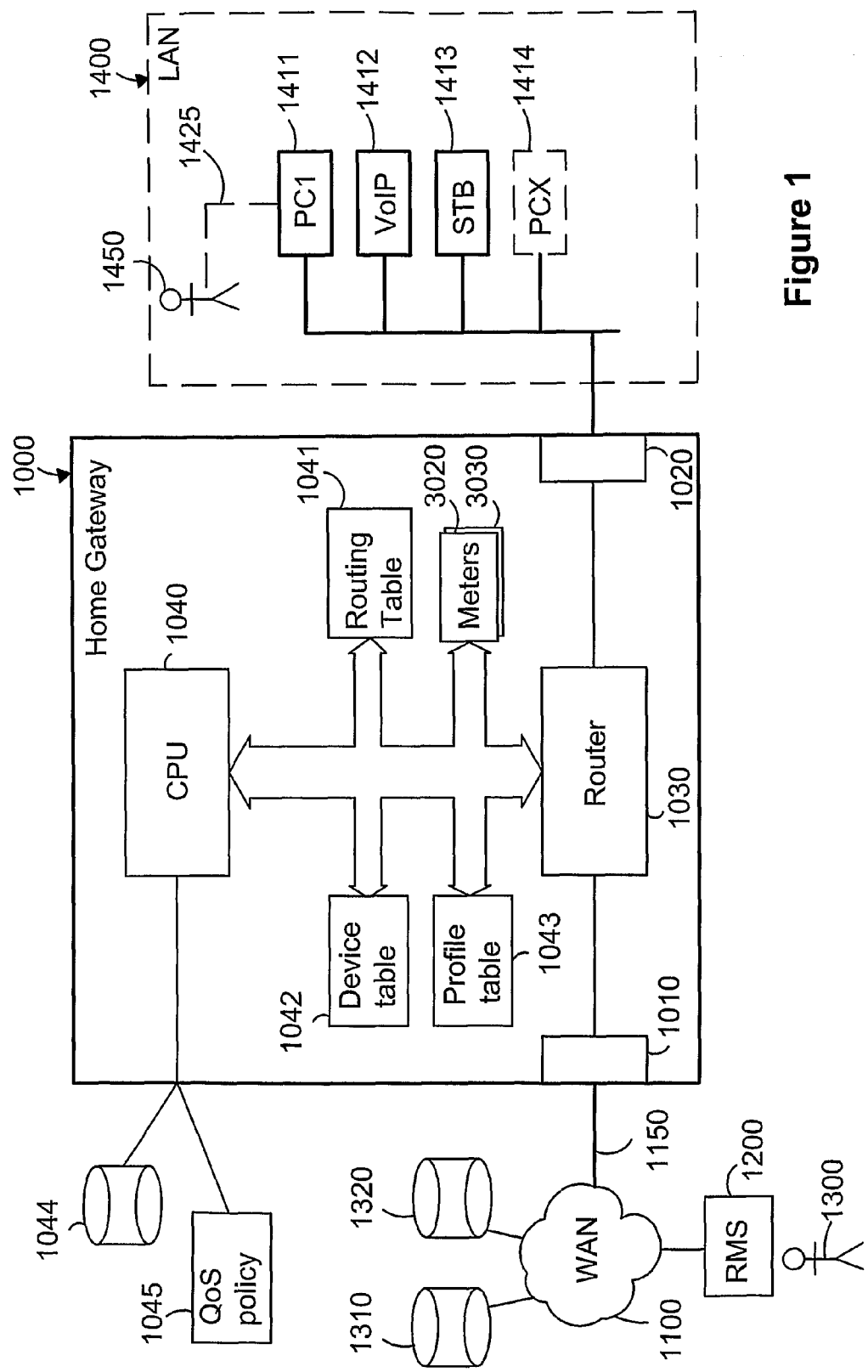
FIG. 1 is a block diagram showing a home gateway according to the current invention.
Figure 2:
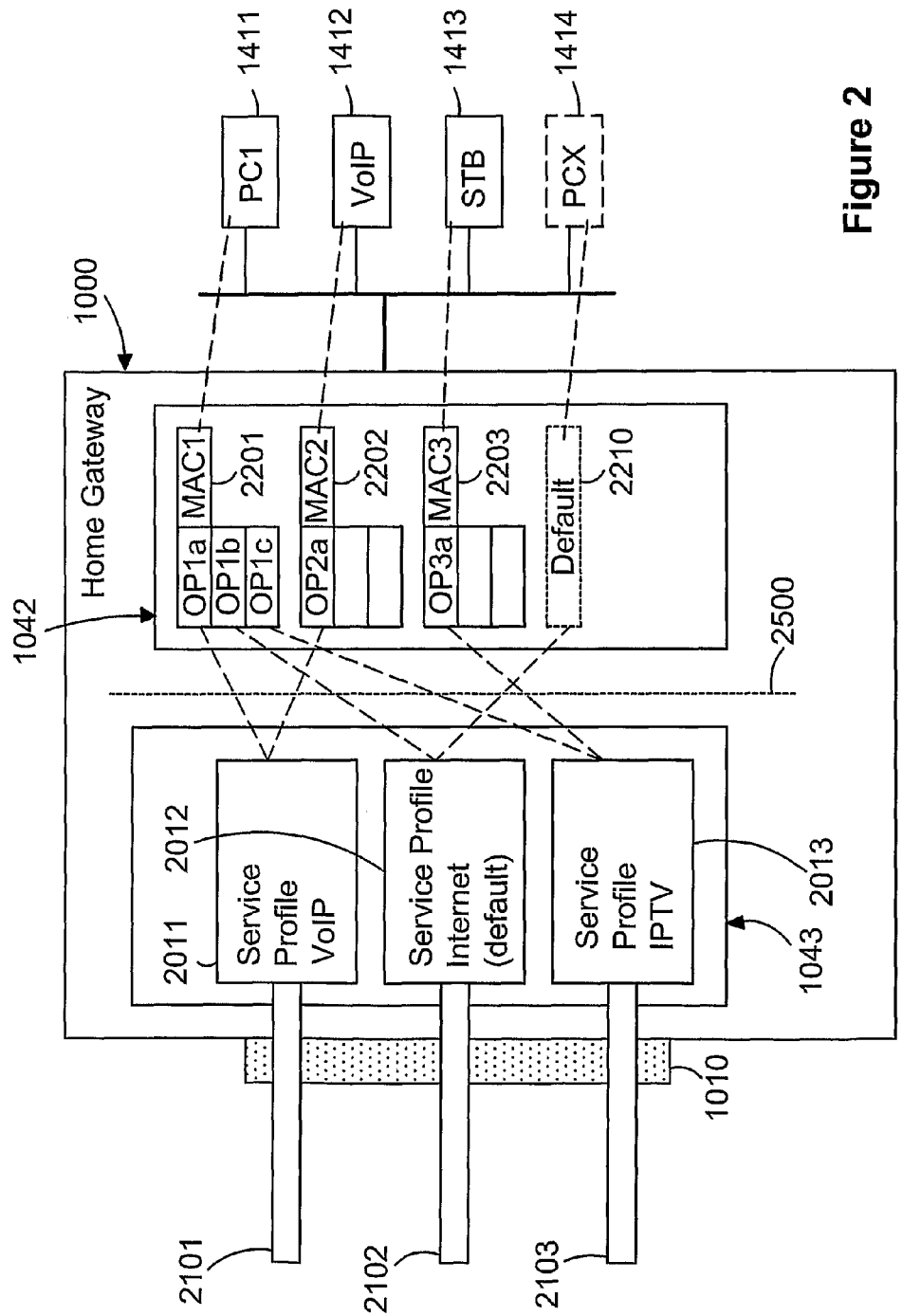
FIG. 2 is a block diagram showing a logical representation of and associations between service profiles and customer premises devices in the home gateway.
Figure 3:
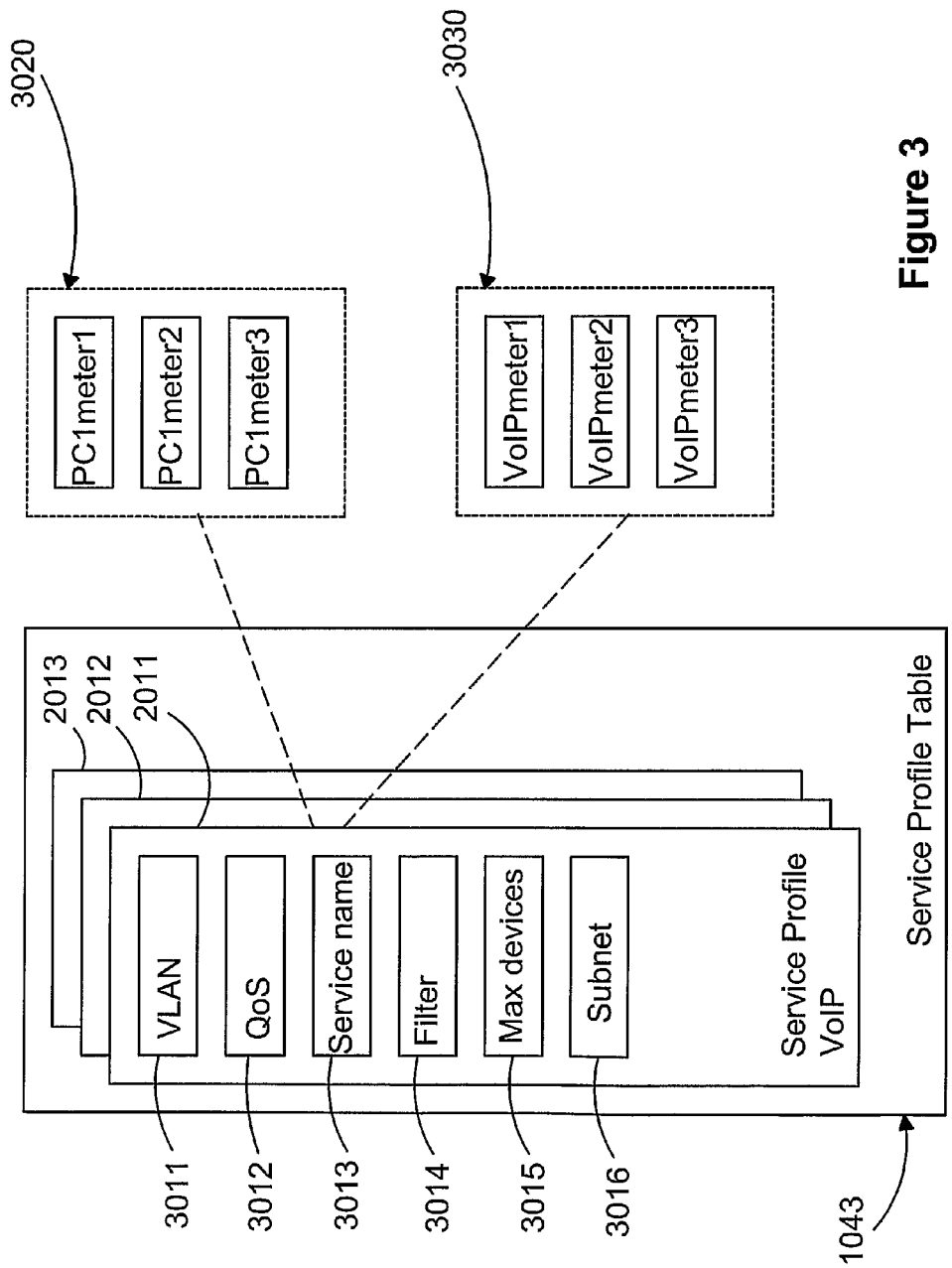
FIG. 3 is a block diagram showing a service profile comprising a plurality of service parameters and a plurality of sets of meters for traffic measurement data associated to the service profile.

An embodiment of a telecommunication node according to the current invention is illustrated in FIGS. 1 to 3. FIG. 1 illustrates a home gateway device 1000 connected through a first physical interface (an input interface) 1020 to a first telecommunication network such as a Local Area Network (LAN) 1400 comprising a plurality of customer premises devices 1411-1414. The LAN 1400 can typically be located in a private home or a small office. The customer premises devices are of different types, two PCs, PC1 1411 and PCx 1414, a set-top box STB 1413 used for video distribution to television sets and a Voice over IP telephone set VoIP 1412. The home gateway 1000 is further connected through to second physical interface (an output interface) 1010 to a telecommunication network 1100 such as an access network or a wide area network WAN to which one or several service nodes 1310, 1320 belonging to the same or different service operators are connected. The service nodes 1310, 1320 are offering different services (IPTV, VoIP etc) to the customer premises devices 1411-1414 in the LAN 1400 through the home gateway 1000. The second physical interface could be of different types supporting different technologies, such as DSL (Digital Subscriber Line), cable (DOCSIS), Ethernet, fiber etc. The first physical interface 1020 is connected to the LAN 1400. The LAN 1400 can use technologies such as Ethernet, Wi-Fi, Power Line Communications (PLC) etc.

The home gateway 1000 does also comprise a router 1030 and a routing table 1041 arranged to route data packets between the WAN 1100 and the LAN 1400.

In order to allocate different services to the different customer premises devices 1411-1414 the gateway 1000 comprises a service profile table 1043 and a customer device table 1042 associated with each other over a table interface 2500 (shown in FIG. 2). The functions of and the associations between these two tables 1043, 1042 are described more in detail further below.

The gateway 1000 can optionally be connected to a Quality of Service repository 1044 and a Quality of Service enforcer 1045. These two entities are useful for the operator when the LAN 1400 is based on a shared access media technology such as WMM (Wi-Fi multimedia), PLC etc. Using these two entities, the operator can guarantee end-to-end Quality-of-Services of traffic from the service nodes 1310, 1320 towards the customer premises devices 1411-1414.

The home gateway 1000 does also comprise a number of meters organized in sets 3020, 3030. These meters are arranged to collect traffic measurement data for the traffic to and from each customer premises device 1411-1413.

The router 1030, the sets of meters 3020, 3030, the different tables 1041-1043 are accessed and controlled by processing means such as a CPU 1040.

The home gateway 1000 is further connected to a remote management system RMS 1200. The RMS 1200 normally belongs to the service operator 1300 in order to access the different tables 1041-1043 and the sets of meters 3020, 3030 in the gateway 1000. One table, the customer device table 1042 is also accessible through a web based interface 1425 through one of the customer premises devices, in this case through the PC1 1411. As an option, this web interface can be password protected if the gateway 1000 is used in a multi-user environment.

From a node management point of view, the gateway 1000 can be seen as divided in two separate parts, one operator 1300 accessible and configurable part comprising the routing table 1041 and the service profile table 1043 and one user 1450 accessible and configurable part comprising the customer premises device table 1042. Optionally, for users 1450 not requiring the flexibility to configure the customer device table 1042 by themselves, the table 1042 can be accessed and configured from the remote management system RMS 1200 as well. The operator 1300 can for example use a management protocol such as the DSL Forum TR-69 auto-configuration protocol to access the different tables 1041-1043.

The content in the device table 1042 can also be configured using the Universal Plug and Play (UPnP) network architecture by making intelligent guesses about service capabilities in the customer premises devices 1411-1414.

The device table 1042 can further be given default factory settings before the home gateway 1000 is delivered to the user 1450.

FIG. 2 illustrates an embodiment with a home gateway 1000 and four customer premises devices 1411-1414 connected to said gateway 1000. FIG. 2 also illustrates the service profile table 1043 and the customer device table 1043 and the table interface 2500 over which the two tables 1042, 1043 are associated with each other.

The home gateway 1000 is connected to the WAN 1100 through the second physical interface 1010. The second physical interface 1010 comprises a plurality of logical output interfaces 2101-2103. In this embodiment each logical output interface 2101-2103 is a Virtual LAN (VLAN) interface.

The service profile table 1043 is in this embodiment comprising three service profiles 2011 (for a VoIP service), 2012 (for an Internet service) and 2013 (for an IPTV service). Each service profile 2011-2013 is associated with a logical output interface 2101-2103 respectively. Each service profile 2011-2013 further comprises a set of service parameters 3011-3016 as seen in FIG. 3 which define the specific service for each service profile 2011-2013. This set of service parameters 3011-3016 can include parameters such as 3011, a logical interface identity (e.g. VLAN identity for Ethernet).

3012, QoS parameters, such as a priority level attached to the packet (e.g. according to IEEE 802.1p).

3013, a service name (such as IPTV, VoIP, Internet, Gaming etc).

3014, service restrictions (such as MAC vendor filters).

3015, maximum number of customer premises devices allowed to be connected to the service profile 2011-2013.

3016, IP address and subnet for the service.

The customer device table 1042 in this embodiment comprises the source addresses 2201-2203 of the customer premises devices 1411-1413 respectively where each source address 2201-2203 is a MAC address of each device 1411-1413. Each MAC address 2201-2203 is associated to at least one service profile 2011-2013.

The association between the MAC addresses 2201-2203 and the service profiles 2011-2013 are here implemented using pointers OP1a, OP1b etc for each MAC address 2201-2203 where each pointer OP1a, OP1b etc is pointing to one of the service profiles 2011-2013.

As an option, the customer device table 1042 also comprises a default association 2210 for unknown customer premises devices 1414. Unknown customer premises devices 1414 are devices having a MAC address not explicitly associated with any service profile 2011-2013 in the service profile table 1043. An unknown device 1414 can for example be a PC that is temporary connected to the LAN 1400 by the user 1450 or a visitor.

The default association for the unknown device 1414 is a default service profile that in this case is the Internet service profile (2012). By this default association, any visiting unknown device 1414 can access the Internet for web browsing but can not access any other service. The default association can also be part of factory settings made before the home gateway 1000 is delivered to the user 1450.

In FIG. 2 the customer device PC1 1411 is a multimedia PC having the MAC address MAC1 2201. PC1 1411 has been configured to access all the services profiles 2011-2013 as MAC1 2201 has three pointers OP1a, OP1b, OP1c, each pointing to one of the three service profiles 2011-2013 respectively. The VoIP telephone 1412 is on the other hand limited to access only the VoIP service as its MAC address MAC2 2202 has only a pointer OP2a to the service profile 2011. Similarly, the set-top box STB 1413 is limited to access IPTV services only as its MAC address MACS 2203 has only a pointer OP3a to the service profile 2013. The fourth customer premises device PCX 1414 is a PC recently connected to the home gateway 1000. As PCX 1414 is not yet explicitly configured to any service profile 2011-2013 it has currently a pointer to the default service profile 2012 (Internet). PCX 1414 can consequently not yet access any of the other two services.

As shown in FIG. 2, each service profile 2011-2013 is associated with a logical output interface 2101-2103 respectively. This association is deduced from one of the service parameters 3011-3016 in each service profile 2011-2013, that is the parameter 3011 comprising the identity of the logical output interface 2101-2103 (such as the VLAN id).

The routing table 1041 and the router 1030 (See FIG. 1) are components configured and arranged to determine the logical output interface 2101 to be used for forwarding the data packets from the customer premises devices 1411-1414. This is done by analyzing at least the destination address in each received data packet. The destination address to any of the service nodes 1310, 1320 can (as well as the source address 2201) consist of a MAC address but is normally an IP address. The router uses traditional routing determination processes such as longest match, and the determination of the logical output interface 2101 can in addition to the destination address also include the analysis of the source address, the protocol type and the TCP/UDP logical port number for the destination and/or the source port in the received packet.

Figure 4:
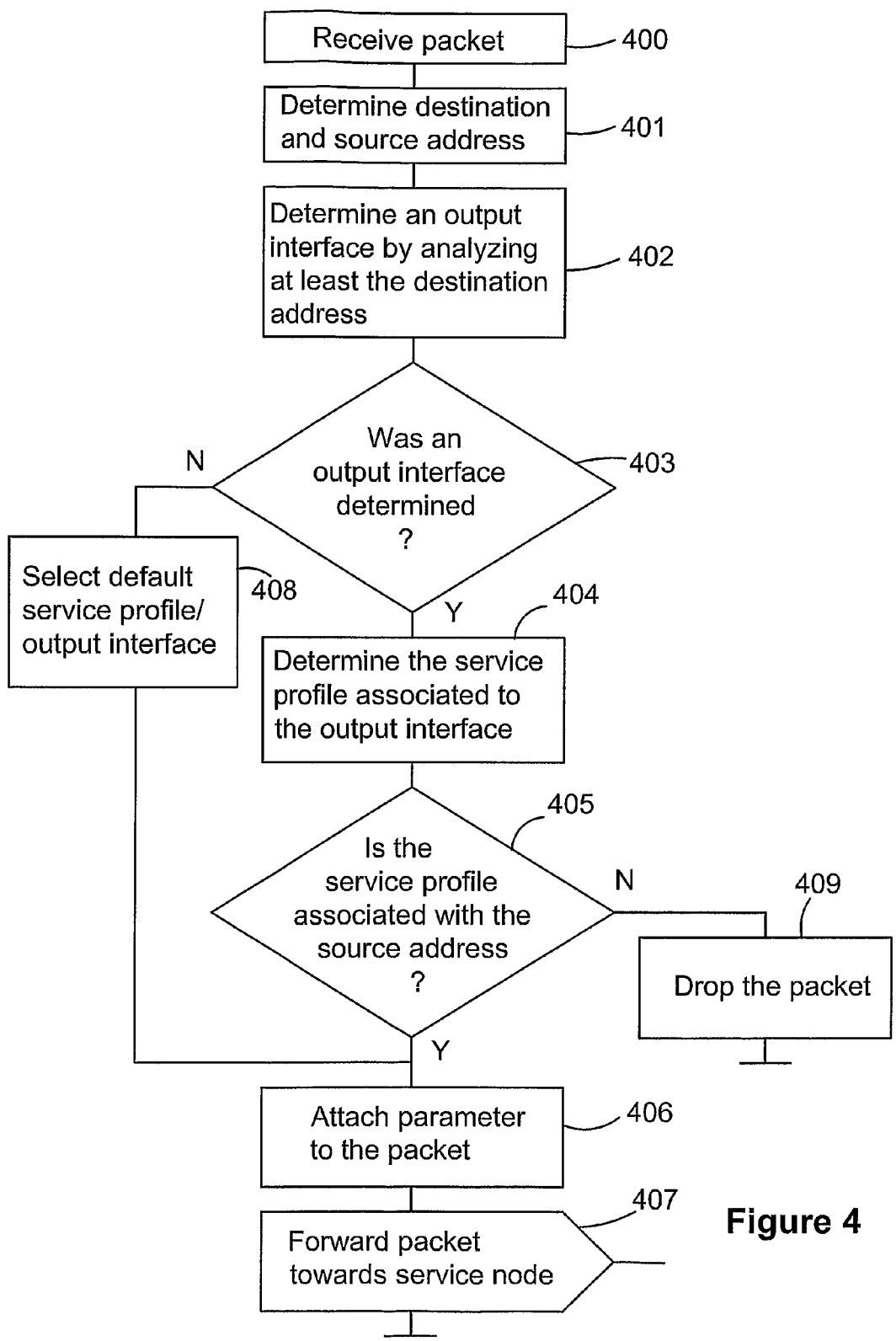
FIG. 4 is a flow chart showing the method to route data packet according to the current invention.

A method in the home gateway 1000 to route a data packet received from a customer premises device 1411-1413 towards a service node 1310, 1320 is illustrated in FIG. 4.

Assume for example that the VoIP telephone 1412 is to communicate with the service node 1320 providing VoIP services. When the home gateway 1000 receives in step 400 a data packet from the VoIP telephone 1412, the gateway 1000 determines in step 401 at least the source address 2202 and the destination address in the data packet. By analyzing at least the destination address, an output interface 2101 adapted to forward said packet is determined in step 402. By looking in each service parameter 3011 comprising the identity of the logical output interface 2101-2103 in each service profile 2011-2013 the associated VoIP service profile 2011 is determined in step 404. In a next step 405 a check is made if the source MAC address MAC2 2202 of the VoIP telephone 1412 is associated (e.g. has a pointer) to any of the service profiles 2011-2013. In FIG. 2, MAC2 2202 has a pointer OP2a which is pointing to the VoIP service profile 2011. Consequently the VoIP telephone 1412 is allowed to use the service profile 2011 and the data packet is forwarded in step 407 towards the service node 1320 over the logical output interface 2101. If no association had been found between the VoIP service profile 2011 and MAC2 2202 of the VoIP telephone 1412, the data packet would simply have been dropped in step 409. Optionally, the value of one or several QoS parameters (e.g. an IEEE 802.1p priority level indication) is attached to the packet in step 406. This QoS parameter can be used by different intermediate network elements (not shown) in the WAN 1100 to prioritize the data packet.

If a customer premises device such as the PCX 1414 is connected to the home gateway 1000 but not yet associated with any service profile 2011-2013 starts to send data packets, the destination address in the data packet is analyzed as described above. If the analysis in step 402 determines a logical output interface 2101-2103 and that said interface 2101-2103 is associated with a service profile 2011-2013 (determined from the analysis in step 404) a check of the source MAC address MACX is made in step 405. As PCX 1414 is not yet associated with any service profile 2011-2013, the packet is dropped in step 409.

If however the analysis of the destination address in the data packet from PCX 1414 in steps 402, 403 does not yield any logical output interface 2101-2103, the interface 2102 associated with the default service profile (the Internet profile) 2012 is selected in step 408.

By using the default service profile 2012, any customer device 1414 PCX temporarily connected to the home gateway can gain access to the Internet, but is barred from using the other two services as VoIP of IPTV.

The home gateway 1000 in the current invention does include the possibility to perform traffic measurements of the service usage for each customer premises device 1411-1413. FIG. 3 illustrates an example of this. For each service profile 2011-2013 there is an associated set of meters 3020, 3030 for each customer premises device 1411-1413 having a source (MAC) address associated with said service profile 2011-2013.

The set of meters 3020, 3030 are enabled and associated to the service profile 2011-2013 on the same time as the user (or the operator) associates a MAC address 2201-2203 to said service profile 2011-2013 as described above. In the example in FIG. 3, the VoIP service profile 2011 has two associated sets of meters enabled, a first set 3020 comprising the meters PCmeter1-3 and a second set 3030 comprising the meters VoIPmeter1-3. The first set 3020 collects traffic data for PC1 1411 and the second set 3030 collects data for the VoIP telephone 1412. The other service profiles 2012, 2013 have their own sets of meters (not shown in FIG. 3). For unknown devices 1414 a corresponding set of meters is implemented. This set is enabled and associated when defining the default service profile 2012. In one embodiment this set of meters collects aggregated traffic data for all unknown devices 1414.

The meters PCmeter1-3 and VoIPmeter1-3 could for example measure and store the following data:
  number of data packets sent and received
  delay time
  delay variation (jitter)
  session time
  packet loss
  session setup time
  etc Each meter can be read and reset at an on-demand basis from the remote management system RMS 1200 using any of the management protocols described above. The meters can also be uploaded to the RMC 1200 on a regular basis. As the processing is done in the home gateway 1000, the processing load of the measurements scales very well.

Having access to these meters (e.g. PCmeter1-3 and VoIPmeter1-3) the service operator 1300 can collect valuable statistics on the usage of and the behavior pattern for each service and each customer premises device 1411-1413. The operator 1300 can also use these meters PCmeter1-3, VoIPmeter1-3 to monitor the traffic to ensure that it meets user's expectations when it comes to Service Level Agreements SLA etc.

The operator 1300 can even use these statistics to determine what type of customer premises device 1411-1413 is accessing and using a certain service as the MAC address of each device 1411-1413 is unique and has a given structure.

With these statistics, the operator 1300 can among others improve the network resource management, improve network planning and construct new business models around the user's 1450 service behavior.

Figure 5:
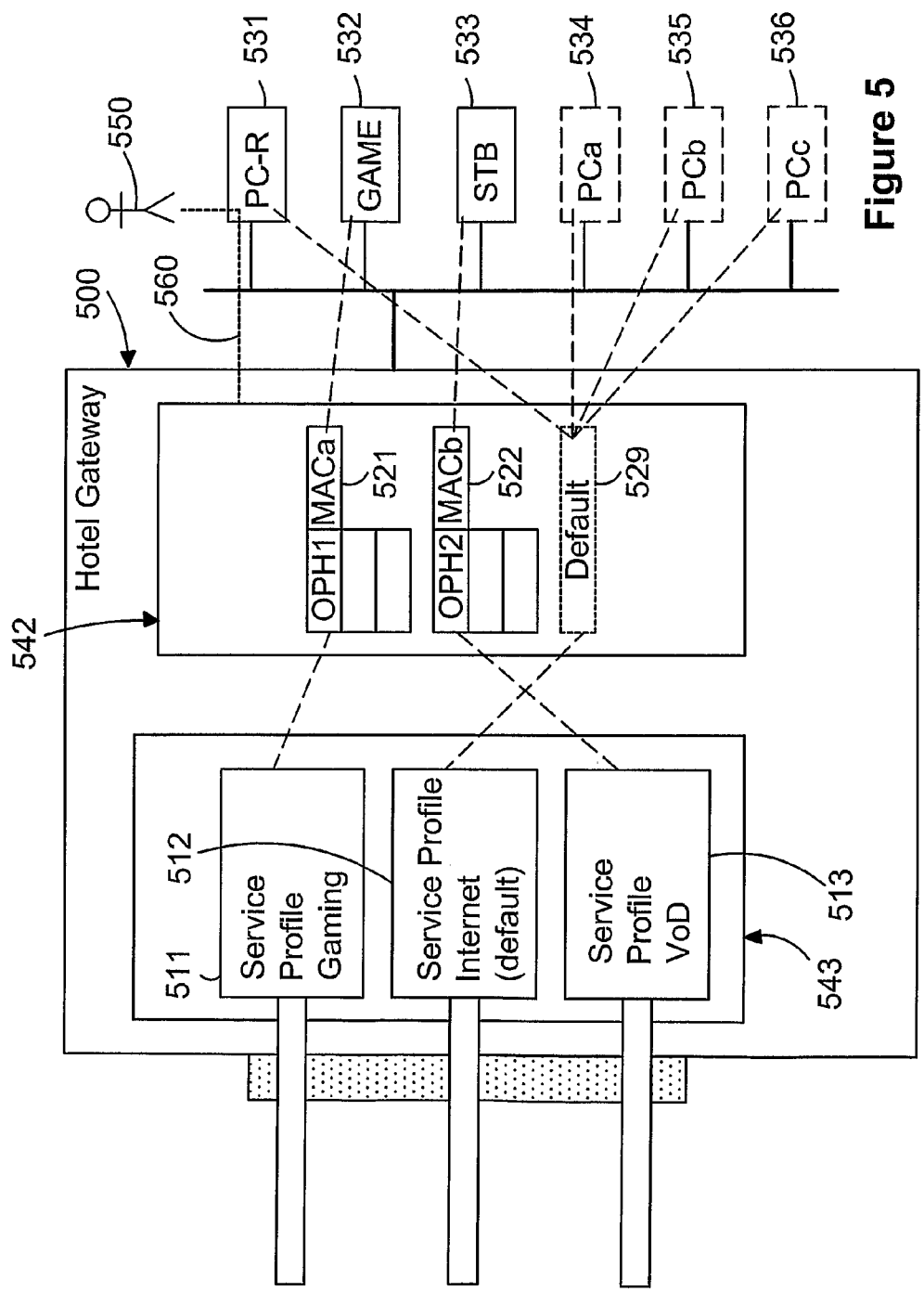
FIG. 5 is a block diagram of a hotel gateway in an exemplary embodiment of the current invention.

For a person skilled in the art, the current invention is not limited to home gateways in a home network. On the contrary the invention can be used in a number of other scenarios such as in small offices, hotels, conference centers etc. FIG. 5 illustrates an embodiment of the current invention, a hotel gateway 500, used in a hotel. Each room in the hotel is provided with a LAN socket through which each guest can connect a customer premises device to the gateway 500. The gateway 500 is comprising a service profile table 543 and an already configured customer premises device table 542 and is connected to six different customer premises devices 531-536. The device PC-R 531 is the receptionist's PC from where the customer premises device table 542 can be configured through a password protected web interface 560. Three guests have connected their laptops PCa-PCc 534-536 to their LAN socket. These laptops 534-536 can immediately access the default service profile 512 which is configured for Internet access and web browsing. Another guest has hired a game console GAME 532 (having a MAC address MACa) in the reception and has connected this to the LAN socket. The receptionist 550 has made an association OPH1 between the MAC address MACa and a gaming service profile 511 from its terminal PC-R 531. By this, the guest can now access a game server (not shown). For yet another guest that wants to watch a movie, the receptionist 550 has made an association OPH2 between a set-top box STB 533 (having a MAC address MACb) and a Video-on-Demand VoD service profile 513. The three guests with the laptops PCa-PCc 534-536 can not access the game server or the VoD service as there are no associations made between the devices 534-536 and the service profiles 511, 513.

The invention claimed is:

1. A method in a telecommunication node for routing data packets received from a customer premises device having a source address towards a service node having a destination address, said method comprising the steps of:
  receiving by an input interface, a data packet from the customer premises device, the data packet including the source address of the customer premises device and the destination address of the service node;
  determining by a routing table, an output interface associated with the destination address, the output interface for forwarding the received data packet toward the service node;
  identifying by a service profile table, a service profile associated with the output interface, wherein the service profile includes at least one service parameter;
  determining whether the service profile is associated with the source address utilizing a table interface over which selected service profiles in the service profile table and the source address of the customer premises device are associated with each other; and
  forwarding the data packet towards the service node over the output interface if the service profile is associated with the source address;
  wherein when the customer premises device sends a different packet to the telecommunication node with a different destination address, the method further comprises the telecommunication node providing the customer premises device with access to a different service node when the table interface indicates the source address of the different packet is associated with one of the service profiles in the service profile table.

2. The method as recited in claim 1, further comprising attaching a value of the at least one service parameter to the data packet before forwarding the packet.

3. The method as recited in claim 2, wherein the at least one service parameter is a Quality of Service parameter.

4. The method as recited in claim 1, wherein the source address comprises a MAC address of the customer premises device.

5. The method as recited in claim 1, wherein the at least one destination address comprises a MAC address of the service node.

6. The method as recited in claim 1, wherein the at least one destination address comprises an IP address of the service node.

7. The method as recited in claim 6, wherein the at least one destination address also includes a destination port number.

8. The method as recited in claim 1, wherein the output interface is a virtual LAN interface.

9. The method as recited in claim 1, wherein the telecommunication node is a home gateway, and the customer premises device is located in a local area network connected to the home gateway.

10. A telecommunication node for routing data packets from at least one customer premises device towards at least one service node, the telecommunication node comprising:

a processor coupled to a non-transitory memory, the processor configured to control operation of the telecommunication node;

a service profile table configured to store a plurality of service profiles, each service profile associated with a different output interface toward a different service node, wherein each service profile includes at least one service parameter;

a customer premises device table configured to store a source address of a customer premises device;

a table interface over which selected service profiles in the service profile table and the source address in the customer premises device table are associated with each other;

an input interface configured to receive from the customer premises device data packet including the source address of the customer premises device and a destination address; and a routing table configured to determine from the destination address of the packet, an output interface and a service profile associated with the determined output interface;

wherein the processor is configured to route the packet to the determined output interface when the table interface indicates the source address is associated with the service profile associated with the determined output interface; and wherein when the customer premises device sends a different packet to the telecommunication node with a different destination address, the telecommunication node is configured to provide the customer premises device with access to a different service node when the table interface indicates the source address of the different packet is associated with one of the service profiles in the service profile table.

11. The telecommunication node as recited in claim 10, wherein the service profile table includes at least one configurable service profile comprising at least one service parameter.

12. The telecommunication node as recited in claim 11, wherein the service profile table is operator-configurable.

13. The telecommunication node as recited in claim 12, further comprising means for connecting over a management protocol to a Remote Management System (RMS) from where an operator can configure the service profile table.

14. The telecommunication node as recited in claim 11, wherein the customer premises device table and the table interface are user-configurable.

15. The telecommunication node as recited in claim 14, further comprising a web interface accessible from the at least one customer premises device from where the user can configure the customer premises device table and the table interface.

16. The telecommunication node as recited in claim 11, further comprising at least one set of meters for storing traffic measurement data.

17. The telecommunication node as recited in claim 16, wherein the at least one service profile is associated with the at least one set of meters.

18. The telecommunication node as recited in claim 17, further comprising means for connecting over a management protocol to a remote management system RMS from where content of at least one meter in the at least one set of meters can be read or altered by the operator.

* * * * *

UNITED STATES PATENT AND TRADEMARK OFFICE
CERTIFICATE OF CORRECTION

PATENT NO. : 8,351,427 B2
APPLICATION NO. : 12/520937
DATED : January 8, 2013
INVENTOR(S) : Damola et al.

It is certified that error appears in the above-identified patent and that said Letters Patent is hereby corrected as shown below:

In Column 3, Line 1, delete "form" and insert -- from --, therefor.

In Column 5, Line 47, delete "MACS" and insert -- MAC3 --, therefor.

In Column 7, Line 22, delete "etc" and insert -- etc. --, therefor.

Signed and Sealed this
Ninth Day of April, 2013

Teresa Stanek Rea
*Acting Director of the United States Patent and Trademark Office*